L. MILLER.
Thrashing Machine Gearing.
No. 31,764.
Patented March 19, 1861.
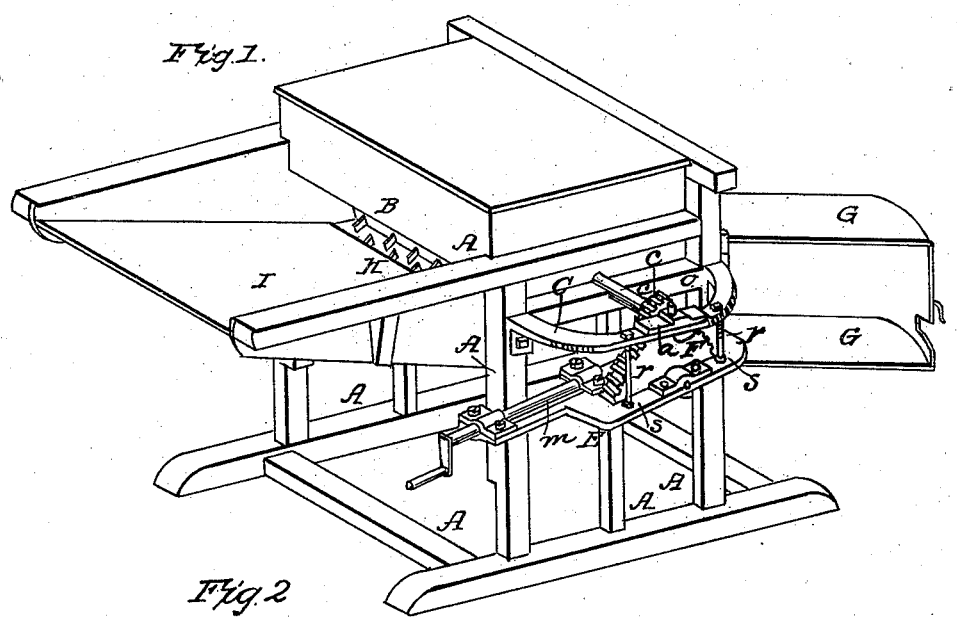
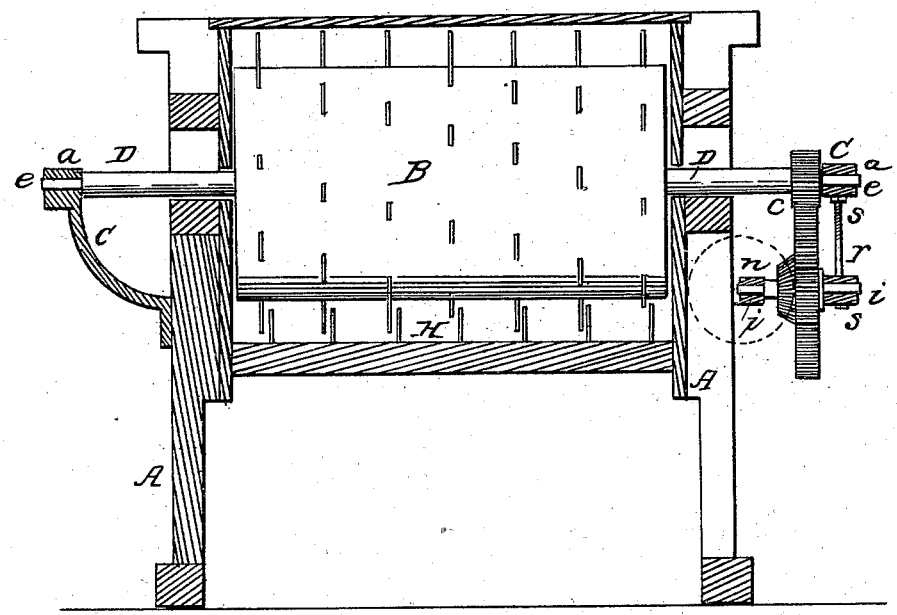

UNITED STATES PATENT OFFICE.

LEWIS MILLER, OF CANTON, OHIO, ASSIGNOR TO C. AULTMAN & CO., OF CANTON, OHIO.

GEARING FOR THRESHING-MACHINES.

Specification of Letters Patent No. 31,764, dated March 19, 1861.

*To all whom it may concern:*

Be it known that I, LEWIS MILLER, of Canton, in the county of Stark and State of Ohio, have invented certain new and useful Improvements in the Running-Gear of Threshing - Machines; and I do hereby declare the following to be a full, clear, and exact description of the same, reference being had to the accompanying drawings, making a part of this specification, in which—

Figure 1, represents a perspective view from the geared side of a threshing machine. Fig. 2, represents a transverse vertical section, and showing an edge view of the gearing.

There are several difficulties encountered in threshing machines, which it is my object to avoid. The dust and dirt thrown off in the operation of threshing, so clogs up the journal boxes, as to make the parts run hard or cut out. This I remedy to a very great extent by carrying the journal boxes out of the machine and supporting them upon brackets, and incasing them or covering them to protect them from this gritty dust. By removing the journal boxes or bearings out beyond the frame, I am enabled to put the gearing on the shafts between the journals, instead of outside of them as heretofore done. This is very important, because the torsion, or power required to turn the cylinder or other shaft, comes upon the strongest and largest part of the shaft, and not upon the journal as is the case when the gearing is on the outside of the journal, and hence I can use a very small journal, and correspondingly diminish the friction in the journal boxes or bearings.

My invention therefore consists in making the journals of the cylinder or other shafts beyond or outside of the gearing, for the purpose of reducing the size of the journals and getting a corresponding reduction in the friction of them, as well as to remove them as far as possible from the dust and grit thrown off in threshing, as will be hereafter explained.

To enable others skilled in the art to make and use my invention, I will proceed to describe the same with reference to the drawings.

A represents the frame, and B, a threshing cylinder mounted therein. Upon the ends of the frame, are two brackets C, extending out a short distance from the frame upon which brackets are placed the boxes or bearings $a$, in which the journals $e$ of cylinder shaft run. Inside of one of these journals that is to say between the journal and the frame, on the cylinder shaft D, is hung the spur wheel $c$, or belt pulley, by which the cylinder is turned. The power required to turn the threshing cylinder at its usual high speed, then comes upon the large part of the shaft D, and not upon the journals $e$, and hence the journals may be very small, and of course the smaller they are the less the friction upon them, and the less the friction, the less the power to run them, and the less the wear upon them. If the gearing or pulley were put outside of the journal, then the journal would have to be strong enough to stand the force required to run the cylinder. And it is to avoid these large journals that I am striving for.

Underneath the bracket C, at one end of the frame there is a second one E, on which in suitable bearings is hung the main cog wheel F by its small journals $i$ as seen in Fig. 2, to the right thereof. Upon the hub of this wheel F, there is a bevel gear $n$ into which another bevel gear on the shaft $m$ works—said shaft getting its motion from the horse power, or any other first moving power. The inclination of the shaft $m$, and of the bracket E, show the machine as arranged to be driven by a horse power and the lower bracket is shown as suspended from the upper one by adjusting screws $r$ and jam nuts $s$, so as to adjust the gearing to each other as it wears away, or requires it.

$o$ are oil cups, for oiling the journals.

G, is a cover hinged to the frame, and when shut up over the gearing, protects it from dust, injury, or accident to the operator.

The bracket E, holds the journal boxes or bearings of the shaft $m$, and of the main or large cogwheel F, so that in adjusting the bracket, or bed plate E, as it may properly be termed, to adjust the cog-gear F, to the pinion $c$, the shaft $m$, and its bevel gear maintain the same position in relation to the bevel pinion $n$, and the cog gear F.

The cylinder B, and its concave H, are armed with teeth in the usual way, and the grain is fed in in the common way from the table I.

By removing the gearing as far as possible from the threshing cylinder, I mean of course as far as possible without making the machine too large, or without requiring long, heavy and expensive shafting. Far enough to conveniently put the gearing in between the journal bearing, and the side of the machine is sufficient.

Having thus fully described the nature and object of my invention, what I claim therein as new and desire to secure by Letters Patent, is—

Supporting the shaft of a threshing cylinder in bearings arranged outside of, and beyond, the main frame of the machine, when used in connection with driving gearing placed between said bearings, and the main frame, for the purpose of using small journals, and applying the power that is to drive the threshing mechanism, to the heavier and stronger part of the shaft, substantially as, and for the purpose set forth.

LEWIS MILLER.

Witnesses:
DANIEL GOTSHALL,
B. F. MILLER.